United States Patent [19]  [11] 4,004,349
Neumann  [45] Jan. 25, 1977

[54] METHOD FOR FLUID CONVEYANCE OF ARTICLES

[75] Inventor: John W. Neumann, Birmingham, Mich.

[73] Assignee: Oxy Metal Industries Corporation, Warren, Mich.

[22] Filed: Oct. 21, 1975

[21] Appl. No.: 624,547

[52] U.S. Cl. .................................. 34/10; 302/2 R; 302/30; 302/31; 432/9

[51] Int. Cl.² ..................... B65G 51/10; F26B 3/10

[58] Field of Search ...................... 302/2 R, 29–30; 34/10; 432/9; 308/9, DIG. 1; 214/1 BE

[56] References Cited

UNITED STATES PATENTS

| | | |
|---|---|---|
| 3,502,195 | 3/1970 | Benner ............................... 302/2 R |
| 3,704,685 | 12/1972 | Neumann et al. ................... 118/62 |
| 3,782,791 | 1/1974 | Neumann et al. .................... 308/9 |

Primary Examiner—Johnny D. Cherry
Assistant Examiner—Jeffrey V. Nase
Attorney, Agent, or Firm—Harness, Dickey & Pierce

[57] ABSTRACT

A process for conveying thin-walled cup-shaped circular cylindrical articles on a cushion of fluid by positioning them between a plurality of longitudinally-extending members formed with opposing shape-conforming supporting surfaces and having ports therealong for discharging a pressurized fluid against the walls of the article. The magnitude of fluid discharged is controlled to effect an inward deflection of the walls of the article along its trailing open end, imparting a converging taper thereto and producing a force vector for propelling the article in the direction of intended travel along the members. The discharge of fluid from the opposed members is also controlled to produce a separating air cushion between the ends of adjacent articles, resisting impact therebetween during their conveyance along the members.

12 Claims, 10 Drawing Figures

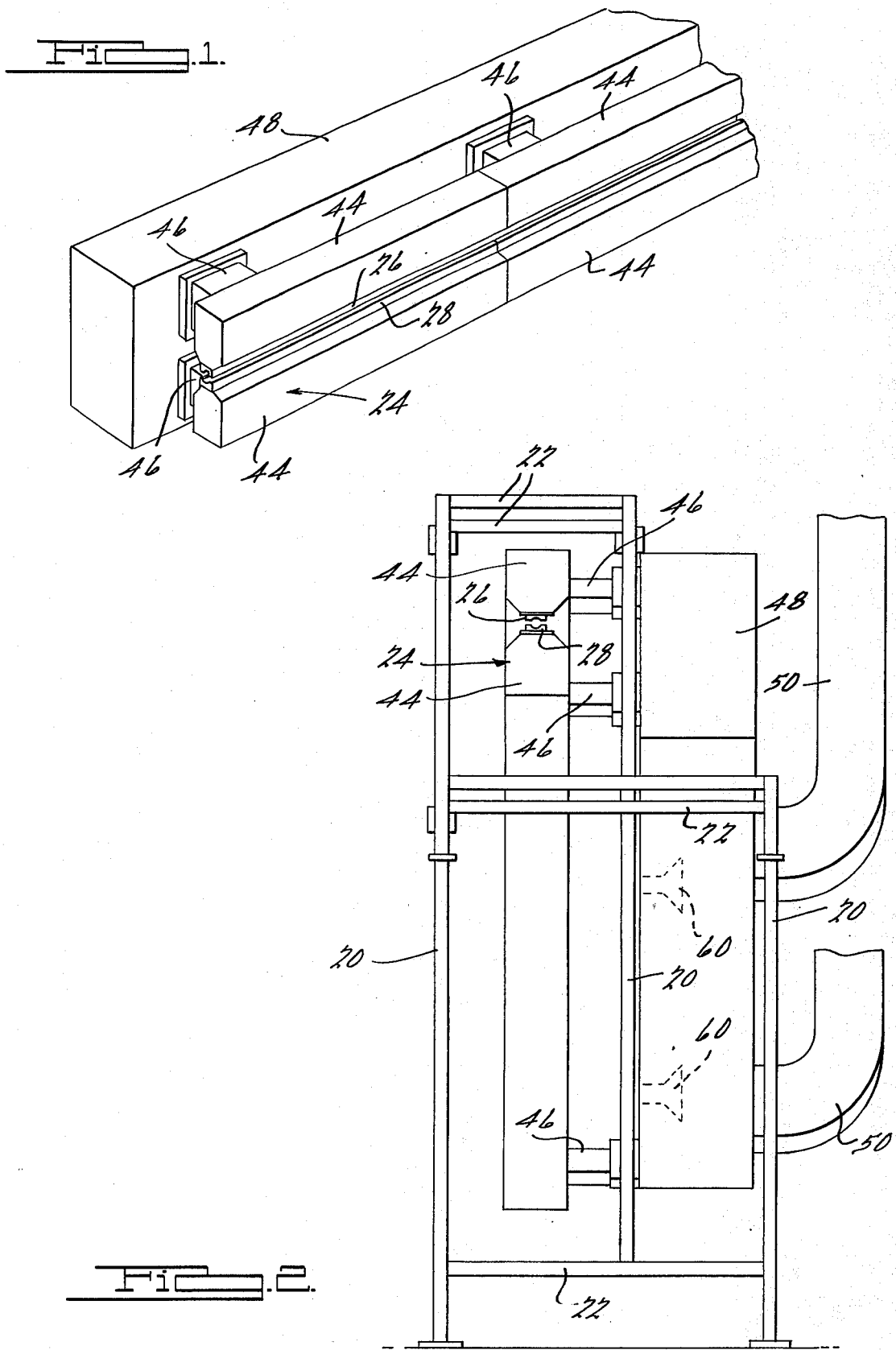

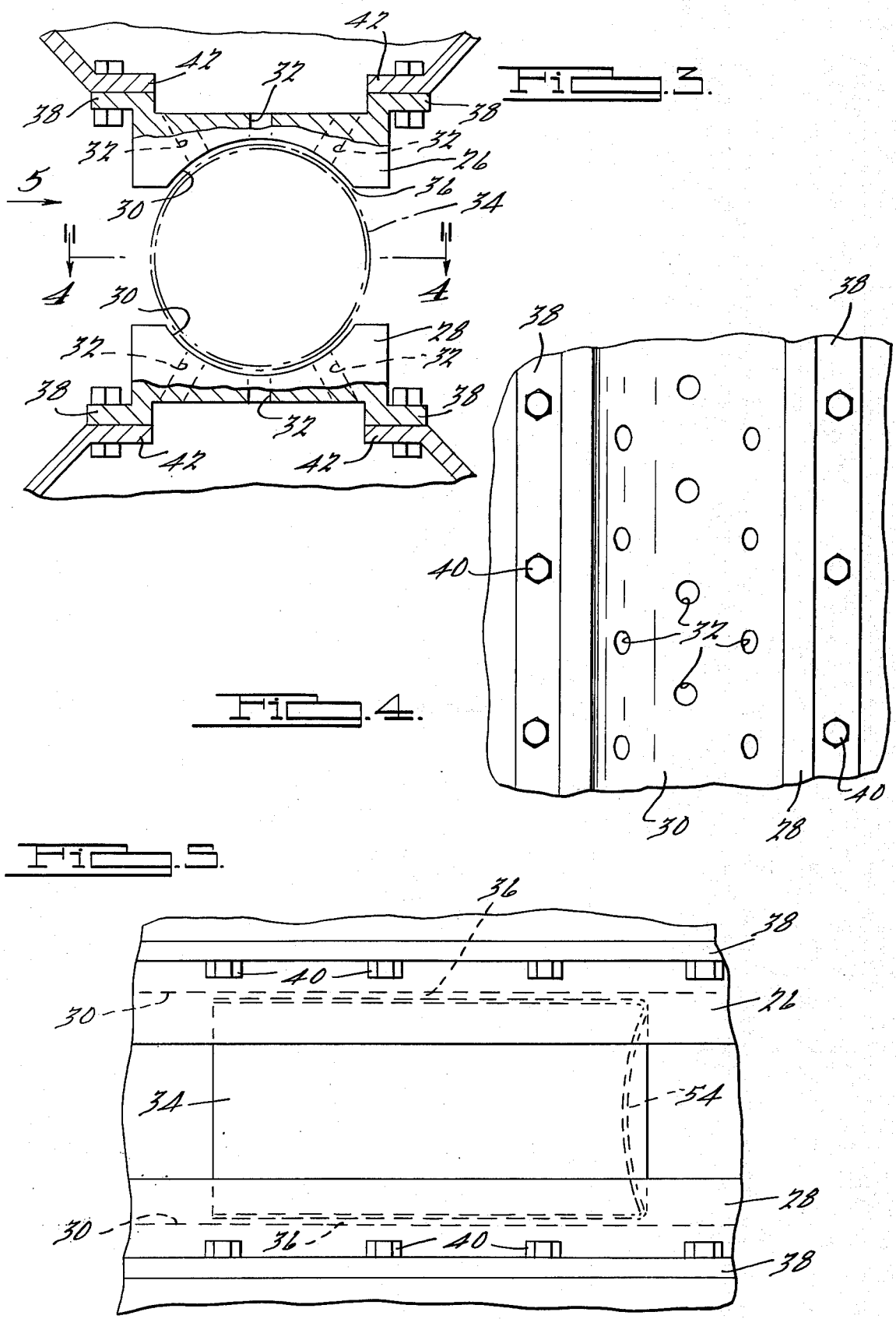

METHOD FOR FLUID CONVEYANCE OF ARTICLES

BACKGROUND OF THE INVENTION

The present invention is particularly applicable but not necessarily limited to the conveyance of thin-walled metallic containers of the general type which are in widespread use for packaging various foodstuffs including beverages or the like which in a preliminary stage of their processing, include a longitudinally extending circular side wall having a closed bottom and an open top. While containers of the foregoing type may be comprised of any one of a variety of materials providing for a thin-walled resilient construction, such as, for example, various plastic materials, tin-plated steel, plastic-lined steel and aluminium; of the foregoing, aluminum containers produced by the deep drawing, or a draw and redraw, or a draw and ironing, of an aluminium blank are perhaps the most common and are receiving increased acceptance. Modern automatic machines have been developed for deep drawing aluminum and steel container bodies in a single operation at high rates of speed up to about 200 container bodies per minute, which after the forming operation are trimmed along their open edge and are thereafter subjected to various cleaning and coating operations prior to entering the filling operation. After the container is filled, a suitable top is affixed conventionally having a tear-tab opener.

Various techniques have heretofore been used or proposed for transporting or conveying the preliminarily-formed containr bodies from the forming step through various treating steps to the filling operation. An apparatus and method for effecting a high-speed treatment of the surfaces of such container bodies is disclosed in U.S. Pat. Nos. 3,704,685 and 3,748,177, which are owned by the same assignee as the present invention. In accordance with the teachings of the aforementioned United States patents, longitudinally-extending guide rods are provided for supporting the workpieces as they are propelled therealong in longitudinally spaced end-to-end relationship and the workpieces, such as containers, are subjected to a plural liquid treatment by the impingement of high pressure liquid streams against the inner and outer surfaces thereof. The treatments may conventionally comprise a cleaning treatment to effect the removal of contaminating substances such as die lubricants from the exterior and interior surfaces of the container bodies and the application of a chemical conversion coating, such as a chromate coating, to the cleaned surfaces improving the resistance of the container to chemical attack and also rendering the surface more receptive to overlying decorative coatings such as a paint, for example, to provide the desired decorative appearance.

Following the treatment of the container bodies, the cup-shaped containers are transferred by various conveying systems to the filler apparatus. A vortex diffuser air rail conveyor as described in U.S. Pat. No. 3,782,791 has been employed for supporting the container body on a cushion of air, minimizing friction and enabling enAbling a setting or drying of the coated surfaces to an extent that the container bodies can be handled without a marring or damage to the coatings thereon.

The high velocity of such container bodies at relatively close spacing intervals during their conveyance on an air rail of the type disclosed in the aforementioned U.S. Pat. No. 3,782,791 has occasioned contact in some instances between the leading and trailing edges of adjacent containers which has occasioned disruptions in the uniform conveyance thereof. Some difficulty has also been encountered in providing a uniform spacing between adjacent containers to enable an orderly transfer of the containers from the air conveyor rail to transfer equipment adjacent to the outlet end thereof.

In accordance with the discovery comprising the present invention, the problems heretofore encountered in connection with the high speed conveyance of containers is overcome, maintaining a substantially uniform spacing between adjacent containers and resisting mutual impact therebetween, avoiding thereby damage to the container and the treated surfaces thereof while further improving the orderly transfer of the containers from the conveyor rail to associated transfer equipment.

SUMMARY OF THE INVENTION

The benefits and advantages of the present invention are achieved by a method in which cup-shaped cylindrical articles of a thin-walled resilient construction are conveyed on a cushion of fluid, such as air, between a plurality of longitudinally extending aligned members, each formed with a shape-conforming supporting surface having a plurality of apertures or ports therein for discharging a pressurized fluid in impinging relationship against the article. The method includes positioning an article between the opposed supporting surfaces oriented with the closed end thereof disposed in the intended direction of travel and controlling the pressure of fluid discharged from the ports to support the article on a cushion of fluid in spaced relationship relative to the supporting surfaces and to further effect an inward deflection of the resilient walls of the articles imparting a converging taper to the articles on moving in a direction from the leading closed end thereof toward the trailing open end of the article, whereby a force vector is created for propelling the article along the longitudinally extending members. The magnitude of fluid discharged from the ports is further controlled to produce an axial rearward flow of a portion of the fluid impinging against the deflected walls of the articles which is directed in impinging relationship axially against the closed leading end of the downstream article adjacent thereto, forming an air cushion between the ends of the articles which imposes a separating force therebetween, resisting contact of the articles and maintaining them in appropriate longitudinally spaced intervals. In accordance with another embodiment of the method, the longitudinally extending members are oriented at an upward angle relative to the horizontal such as from about 3° up to about 10° to facilitate drainage of any residual treating liquid out through the open trailing end of the cup-shaped articles and controlling the magnitude of discharged fluid to provide a force vector sufficient to propel the articles in opposition to the gravitational force exerted on the articles.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a fragmentary perspective view of a conveyor rail concerned to a plenum which is constructed in accordance with the preferred embodiments of the present invention;

FIG. 2 is an end elevational view of a conveyor rail disposed in an inclined position;

Figure 6:
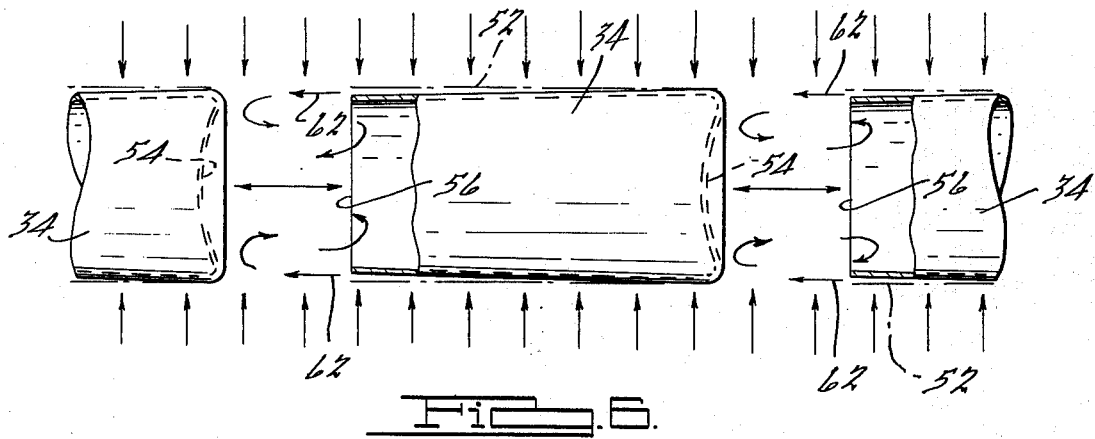
Figure 7:
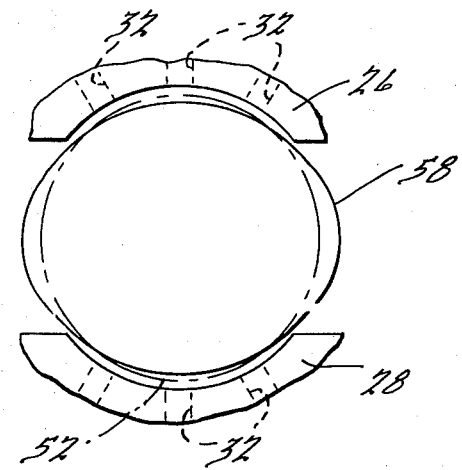
Figure 8:
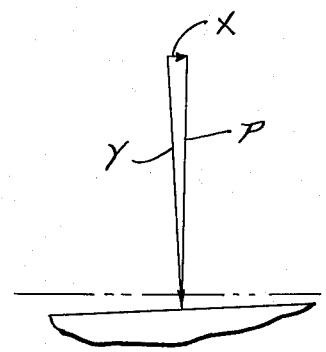
Figure 9:
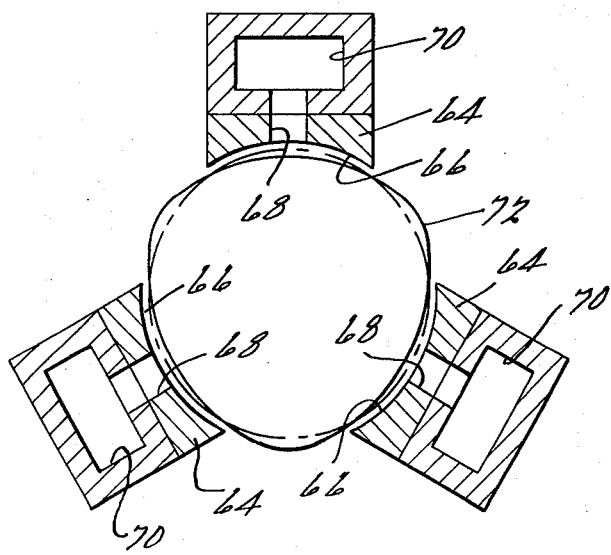
Figure 10:
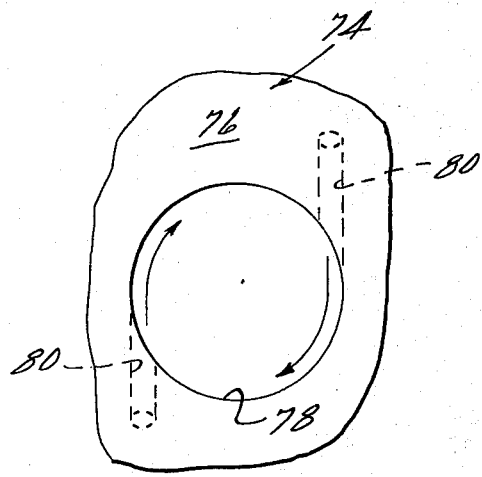

FI. 3 is a magnified fragmentary transverse elevational view partly in section illustrating the disposition of two opposed longitudinally extending members and a cup-shaped article disposed therebetween;

FIG. 4 is a fragmentary plan view of one of the longitudinally extending members and the ported supporting surface thereof as shown in FIG. 3 and as viewed along the line 4—4 thereof;

FIG. 5 is a fragmentary side elevational view of the conveyor rail shown in FIG. 3 and as viewed in the direction of the arrow indicated at 5;

FIG. 6 is a schematic side elevational view illustrating the fluid flow directions and forces applied to a series of cup-shaped articles disposed at spaced intervals along the conveyor rail; h FIG. 7 is a fragmentary end elevational view depicting the deformed configuration of the open trailing end of a cup-shaped article during its transfer along the conveyor rail;

FIG. 8 is A schematic vector diagram illustrating the forces acting on the deflected wall surface of a container during its conveyance;

FIG. 9 is a transverse vertical sectional view, partly schematic, illustrating the use of three longitudinally extending members disposed in substantially equal circumferentially spaced relationship around a cup-shaped article; and FIG. 10 is a magnified fragmentary plan view of a port in one of the longitudinally extended members including inlet means to impart a helical flow pattern to the fluid discharged therefrom.

DESCRIPTION OF THE PREFERRED EMBODIMENTS

Referring now in detail to the drawings and as may be best seen in FIGS. 1 and 2, a structural arrangement suitable for the practice of the method comprising the present invention comprises a steel framework including a series of upright supports 20 and cross-members 22 on wich an air rail assembly 24 is mounted in a generally upward angularly inclined position. In the specific embodiment as shown in FIGS. 1–5, the air rail assembly 24 comprises an upper longitudinally extending member 26 and a lower longitudinally extending member 28, each of which is formed with a partial circular longitudinally extending supporting surface 30 formed with a plurality of apertures or ports 32 which extend through the members and are in communication with the inner surfaces thereof. The upper and lower members are disposed in substantially diametrically disposed relationship and their arcuate supporting surfaces 30 are of a radius generally corresponding to the radius of a cup-shaped workpiece or container 34 as shown in phantom in FIG. 3, thereby providing an annular clearance space indicated at 36. It is also contemplated that the air rail assembly 24 can be mounted in a substantially horizontal or downwardly inclined positon as may be desired.

The upper and lower members 26, 28 are provided with longitudinally extending flanges 38 along the side edges thereof which are secured by means of bolts 40 to the inwardly extending flanges 42 of a manifold chamber 44 extending longitudinally of each member for a portion of the length thereof. Each manifold chamber 44, as best seen in FIGS. 1 and 2, is connected by means of a duct 46 to a plenum 48 extending adjacent to the air rail assembly. A series of supply ducts 50 are connected to the plenum 48 for supplying a large volume of pressurized fluid, such as air, to the plenum which in turn is distributed to the individual manifold chambers 44 for discharge through the ports 32 in the upper and lower rail members. The foregoing arrangement provides for a substantially uniform or controlled variable distribution of the air or other gaseous fluid along the entire length of the air rail assembly.

In the arrangement as shown in FIGS. 3 and 4, the upper and lower members of the air rail assembly incorporate a plurality of the ports 32 which are disposed on triangular spacings and the longitudinal axis of each port is substantially perpendicular to a plane tangent to the curvature of the arcuate supporting surface. The fluid such as air discharged from the manifold chamber through the ports and in impinging relationship against a container 34 disposed between the opposed supporting surfaces is in a direction substantially perpendicular to the exterior wall surface of the container exerting a radial inward force thereagainst in accordance with the general arrangement schematically illustrated in FIG. 6. The velocity and volume of the air discharged is controlled to provide sufficient momentum to effect a deflection of the longitudinal wall of the container from a normal straight circular cylindrical configuration, as indicated in phantom at 52 in FIGS. 6 and 7, to a deflected converging configuration on moving from the closed bottom end, indicated at 54, toward the open trailing end 56 thereof. The converging taper of the container causes the open trailing end to assume an oval configuration indicated at 58 in FIG. 7, which has been exaggerated for the purposes of clarity.

The deflection of the longitudinal side wall of the container in response to the imposition of forces in a direction transverse of its longitudinal axis is represented by force vector P as diagrammatically shown in FIG. 8, which can be resolved into a substantially transverse force vector Y normal to the side wall surface of the container 52 and a force vector X having its major component axially aligned with the intended direction of travel of the container. In spite of the relatively small magnitude of the force vector X, the minimal friction provided by the fluid cushion separating the container walls from the supporting surfaces enables the axial force vector X to propel the containers at a relatively high rate of speed along the air rail assembly. The magnitude of the propelling force vector X can be controlled to provide the desired speed of conveyance by regulating the magnitude of the impact pressure of the fluid discharged as a function of its velocity and volume which in turn controls the magnitude of deflection of the wall of the containers and the magnitude of the resultant vectors X and Y.

In accordance with another embodiment of this invention, the air rail assembly 24 is oriented in an upwardly inclined position of bout 3° up to about 10° and preferably about 5° from the horizontal in accordance with the general arrangement shown in FIGS. 1 and 2, whereby the trailing open end of the container is disposed below the closed leading end facilitating a drainage of any entrapped treating liquid remaining from a preceding liquid processing of the containers outwardly of the open end thereof. It is also contemplated that the gaseous fluid discharged from the air rail assembly can be preliminarily heated such as by heaters schematically indicated at 60 incorporated in the plenum 48 as shown in FIG. 2, to increase the rate of vaporization of any residual treating liquid.

In addition to imparting a deflection to the walls of the container, imparting a propelling force thereto, the discharge of fluid from the air rail assembly is also controlled to cause a portion thereof to become deflected in an axial rearward direction, as indicated by the arrows 62 in FIG. 6, which is directed against the closed end 54 of the downstream adjacent container. Typically, the container 34 has a bottom end wall, as indicated in FIGS. 5 and 6, which deflects the fluid forwardly into the open end of the upstream container. The combined forces exerted by the axially deflected air and forwardly deflected air creates a so-called "air cushion" between the adjacent ends of the containers, applying a separating force thereto which tends to resist contact between the containers and also serves to maintain them in more uniform spaced intervals along the rail assembly. The magnitude of the separating force increases as the proximity of the ends of adjacent containers decreases, applying a braking force to the overtaking container and a propelling force to the overtaken container, tending to increase its velocity along the rail.

In addition to the embodiments as previously described in connection with FIGS. 1–8, it is also contemplated that three or more longitudinally extending members can be employed for defining a longitudinal conveying path for the containers. In accordance with the arrangement illustrated in FIG. 9, three members 64 are employed which are disposed at substantially equal circumferentially spaced increments around a container and are formed with arcuate supporting surfaces 66 which are adapted to be spaced in clearance relationship relative to the periphery of the container. Each member is formed with a plurality of ports 68 connected to a plenum chamber 70 for supplying a high pressure discharge of a gaseous fluid, such as air, in substantial transverse relationship against the longitudinally extending wall of the container for the same purposes as previously described. As a result of the transverse pressure applied, the container is deflected so as to adopt a generally converging configuration toward its trailing edge and assumes a triangular configuration at its open end which is indicated in an exaggerated form at 72 in FIG. 9. Generally, the use of two diametrically opposed members and associated supporting surfaces constitutes the preferred practice in accordance with the arrangement shown in FIGS. 1–5, whereby an increased magnitude of container wall deflection is attained for a given volume of fluid flow in comparison to the arrangement shown in FIG. 9.

In addition to effecting a substantial axial discharge of the pressurized fluid through the ports 32 and 68 of the air rail assemblies, it is also contemplated that the pressurized fluid can be discharged in a manner to incorporate a helical flow pattern in be discharged in a manner to incorporate a helical flow pattern in accordance with the arrangement illustrated in FIG. 10. As shown, a longitudinally extending member 74 having a supporting surface 76 is formed with a cavity 78 of a substantially circular cylindrical configuration extending inwardly of the surface thereof. The base of the cavity 78 is connected by a pair of ports 80 which are disposed in communication with a manifold or plenum chamber therebelow for introducing pressurized fluid into the cavity 78 in a direction tangential to the wall of the cavity causing the air to travel in a circular flow pattern during its axial travel outwardly of the cavity. The resultant helical flow pattern produces a vortex in a manner as described in detail in U.S. Pat. No. 3,782,791, the substance of which is incorporated herein by reference. The vortex is characterized as producing a differential pressure pattern in a plane defined by the supporting surface at the outlet of the cavity 78 which has a lower pressure in the central portion thereof and a higher pressure around the periphery thereof, imparting a so-called push-pull force on a container supported on a cushion of fluid adjacent to the cavity. The volume and velocity of fluid discharged from the cavity 78 of FIG. 10 is similarly controlled so as to effect the desired magnitude of deflection of the container walls and to create the desired magnitude of a separating air cushion between the ends of adjacent containers as previously described.

It is also contemplated that a portion of the ports in the air rail assemblies can be oriented so as to discharge the fluid therefrom in directions other than a substantially transverse direction so as to impart a supplemental propelling force to the containers as well as to impart a rotational force thereto, causing them to rotate during the course of their conveyance along the rail assembly. In addition, it is also contemplated that the axes of the ports 32, as shown in FIG. 3, can all be arranged in parallel relationship to the axes of the central ports 32 to facilitate manufacture of the air rail.

It will be appreciated from the foregoing, in accordance with the method aspects of this invention, that a plurality of resilient cup-shaped articles can be rapidly conveyed while supported on a substantially frictionless cushion of fluid and are propelled therealong by a force vector created as a result of the deflection of the longitudinal wall of the article as may be further supplemented by auxiliary angularly inclined fluid jets and are further maintained at spaced intervals by an air cushion separating adjacent ends of successive containers inhibiting contact therebetween during the course of their conveyance. The method further contemplates conveying the articles in an upwardly inclined direction, facilitating a drainage of any residual liquid from the interior thereof, and further contemplates the use of heated gaseous fluids, such as air, to facilitate the evaporation and drying of the containers, or the curing of organic films thereon, during the course of their conveyance. The pressurized gaseous fluid itself may comprise or contain active constituents for reaction with and/or deposition on the surfaces of the article, performing thereby a combination conveyance and treatment of the article.

While it will be apparent that the invention herein described is well calculated to achieve the benefits and advantages as hereinabove set forth, it will be appreciated that the invention is susceptible to modification, variation and change without departing from the spirit thereof.

What is claimed is:

1. A method of conveying resilient cup-shaped cylindrical articles which comprises the steps of providing a plurality of longitudinally extending members each formed with a supporting surface having a partial circular conforming transverse configuration and formed with a plurality of ports therein, orienting said members to position said supporting surfaces in opposed longitudinally extending alignment at a distance to provide clearance between the walls of an article disposed therebetween, positioning an article with its closed end disposed in the intended direction of travel between the plurality of opposed supporting surfaces, discharging a pressurized fluid from said ports in impinging relationship against the longitudinally extending exterior wall surface of the article in a manner to support the article on a cushion of fluid in spaced relationship relative to said supporting surfaces and to effect an inward deflection of the rearward portion of the article in response to the fluid pressure applied against the wall thereof imparting a converging taper on moving from the leading closed end to the trailing open end of the article and thereby imposing a force vector on the article in the direction of intended travel for propelling the article along said members.

2. The method as defined in claim 1, including the further steps of positioning a plurality of articles in longitudinally spaced relationship between said supporting surfaces and controlling the magnitude of fluid discharging from said ports to produce an axial rearward flow of a portion of the fluid impinging against the deflected walls of the articles which is directed in impinging relationship against the closed leading end of the downstream article forming an air cushion between the ends of adjacent articles imposing a separating force thereon which resists contact between the articles during the course of their travel along said members.

3. The method as defined in claim 1, including the further step of orienting the longitudinal axis of said longitudinally extending members at an angle relative to the horizontal forming an inclined conveying path and controlling the magnitude of the pressurized fluid discharged to produce a force vector sufficient to propel the articles upwardly along the inclined said members in opposition to the gravitational force exerted on the articles.

4. The method as defined in claim 3, in which the orientation of the longitudinal axis of said longitudinally extending members is controlled within an angularity of about 3° up to about 10°.

5. The method as defined in claim 3, in which the orientation of the longitudinal axis of said longitudinally extending members is controlled within an angularity of about 5°.

6. The method as defined in claim 1, in which two of said longitudinally extending members are employed and are positioned such that the supporting surfaces thereof are disposed in diametrically opposed relationship.

7. The method as defined in claim 1, including the further step of discharging the pressurized fluid substantially axially from each of said ports.

8. The method as defined in claim 1, including the further step of discharging the pressurized fluid from each port in a direction substantially perpendicular against the side walls of the cylindrical article.

9. The method as defined in claim 1, including the further step of discharging the pressurized fluid from each said port in a manner to include a rotational component providing a helical flow pattern about the axis of said port.

10. The method as defined in claim 1, in which the fluid comprises a gas.

11. The method as defined in claim 1, in which the fluid is air including the further step of heating the articles to effect a drying thereof during their conveyance.

12. The method as defined in claim 1, in which the fluid discharged from said ports includes a treating agent therein for performing a treatment of the surfaces of the workpieces during the course of their conveyance.

* * * * *